United States Patent Office 2,899,936
Patented Aug. 18, 1959

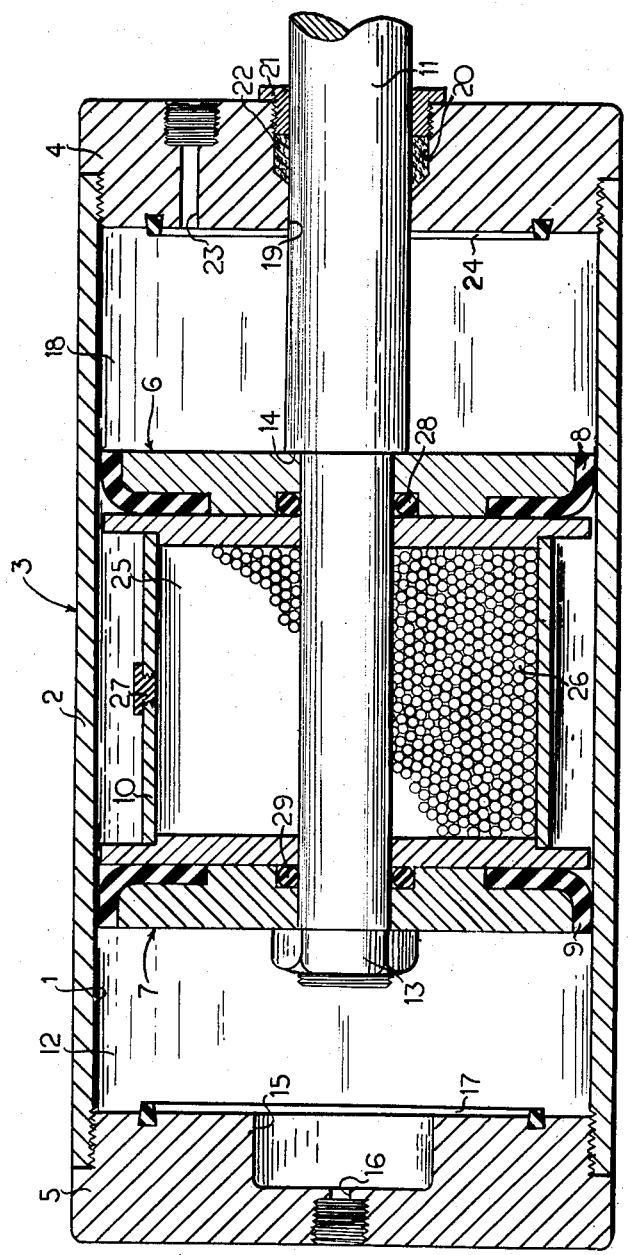

2,899,936

FLUID PRESSURE MOTOR DEVICE EMBODYING PISTON BOUNCE INHIBITING MEANS

John R. Edmund, Berkeley, Calif., assignor to Westinghouse Air Brake Company, Wilmerding, Pa., a corporation of Pennsylvania Application March 5, 1957, Serial No. 644,074

5 Claims. (Cl. 121—38)

This invention relates to fluid pressure motor devices of the double-acting piston type and more particularly to an arrangement for cushioning the piston of such device.

Heretofore, in fluid pressure motor devices of the type wherein a piston is reciprocable within a bore of a cylinder between two limit positions at a high velocity, movement of the piston in either direction may be arrested by a resilient stop on the end portion of the cylinder or by means exterior to the cylinder engaging the piston rod. When the piston is suddenly stopped at the end of a stroke in either direction, the kinetic energy is not completely dissipated, and as a result there is a tendency for the piston to rebound from the limit position thus or to "bounce back," and thereby transmit a shock to the members that may be operatively connected to said piston.

It has heretofore been proposed to provide, in a fluid pressure motor device of the above type, means rendered effective near the end of the piston stroke for trapping the air between the piston and the end portion of the cylinder. With such an arrangement, the air thus suddenly entrapped is often compressed to such a degree by the momentum of the piston that such air tends to expand and thereby cause the piston to rebound.

It is therefore the principal object of this invention to provide an improved fluid pressure motor device of the double-acting piston type, embodying a piston cushioning arrangement that may be used either in lieu of or to supplement the type of piston cushioning arrangement described in the preceding paragraph.

According to this object, the fluid pressure motor device comprises a double-acting hollow piston assemblage and means in the form of loose particles contained within and movable by inertia relative to said piston assemblage for dissipating energy when movement of said piston assemblage is suddenly arrested at or near the end of its stroke and thereby minimizing any tendency for said piston assemblage to rebound after its movement is so arrested.

Other objects and advantages will become apparent from the following more detailed description of the invention and from the accompanying drawing, wherein the single figure is an elevational view, primarily in section, of a fluid pressure motor device embodying the invention.

Description

Referring to the drawing, there is shown a double-acting fluid pressure motor device embodying the invention, which motor device comprises a piston assemblage slidably mounted in a bore 1 in a cylindrical portion 2 of a sectionalized casing 3; said portion 2 being sealingly secured adjacent its respective axial ends to end portions 4, 5 of said casing, as by screw-threaded connection.

The piston assemblage comprises two coaxially arranged pistons 6, 7 having respective packing cups 8, 9, which have slidable sealing contact with the wall of bore 1; a coaxially arranged cylindrical member 10, the opposite ends of which engage the inner faces of the pistons 6, 7 for maintaining said pistons in fixed axially spaced relation, and which has an outer diameter less than the diameter of the bore 1; and a piston rod 11 having a reduced diameter portion that extends centrally through aligned bores in the pistons 6, 7. At its free end, rod 11 projects into a chamber 12 defined between piston 7 and casing portion 5, and has screw threads for accommodating a nut 13 which is tightened against the outer face of piston 7. The outer face of piston 6 engages an outwardly directed radial shoulder 14 joining the reduced diameter portion of the piston rod with the remaining or larger diameter portion of said piston rod, and thus the cylindrical member 10 is firmly held between the inner faces of said pistons, with the entire assemblage being secured tightly to the rod 11.

Fluid under pressure is supplied to and released from chamber 12 via a coaxially arranged recess 15 formed in the inner face of said end portion 5 and an aligned port 16 opening through said end portion; said recess 15 being provided for accommodating the nut 13 with substantial radial clearance to prevent any restriction to fluid flow between said port 16 and chamber 12, and for allowing the outer face of piston 7 to engage a resilient stop 17 suitably mounted in the inner face of said end portion 5 in encirclement of said recess.

The larger diameter portion of piston rod 11 extends through a chamber 18 defined between the outer face of piston 6 and the inner face of end portion 4 and projects exteriorly of said chamber 18 and centrally through a bore 19 in end portion 4. At its projecting end, rod 11 may be connected to a load or to a member (not shown) such as a lever, to be actuated. In order to seal the chamber 18 against leakage of fluid under pressure along the rod through bore 19, a suitable sealing gland may be provided consisting of a gland or sealing ring 22 surrounding the rod and compressed into sealing relation with the rod as by a packing nut 21 having screw-threaded attachment with a counter bore 20 at the outer end of bore 19. Fluid under pressure is supplied to and released from chamber 18 via a port 23 that extends through end portion 4 radially outward of the bores 19, 20. Resilient stop 24 is provided in the inner face of end portion 4 and concentrically arranged around the larger diameter portion of piston rod 11 for engagement by the outer face of piston 6.

According to the invention, cylindrical member 10 and the inner faces of pistons 6, 7 provide an annular chamber 25 surrounding the reduced diameter portion of piston rod 11; and a quantity of aggregate or pellets 26 is inserted into said chamber via an opening through the circumferential wall of member 10, which opening is normally closed as by a removable screw-type plug 27.

O-ring seals 28, 29 are carried by the pistons 6, 7, respectively, and bear against the reduced diameter portion of piston rod 11 for preventing flow of fluid under pressure between chambers 12, 25, and 18.

Operation

Assume that fluid under pressure is supplied to chamber 18 via port 23, while chamber 12 is vented via port 16. Under this condition, the piston assemblage will promptly shift to the left, as viewed in the drawing, to a limit position in which the outer face of piston 7 engages the stop 17. Due to the consequent sudden arresting of the leftward movement of the piston assemblage by the stop 17, the energy remaining in the piston assemblage would normally cause the piston assemblage to rebound or "bounce back" to the right, and thereby transmit a shock through the piston assemblage to the members operatively connected to it. However, with applicant's piston cushioning arrangement, when the outer face of piston 7 strikes the resilient stop 17, the pellets 26 in chamber 25 will, due to inertia, move relative to the piston assemblage and over one another, such that the pellets tend to roll and push to the left and accumulate against the inner face of piston 7, and not only exert a force on the inner face of the piston 7 but also, by doing work, dissipate the energy that would normally tend to cause the piston assemblage to rebound or "bounce back" to the right.

If the dissipation of energy is complete and entire, then there will be substantially little, if any, "bounce back" effect. It is expected, however, that dissipation of energy by the action of the pellets will not be complete and that some "bounce back" effect will occur. However, the effect is dampened and reduced measurably, thereby reducing the severity of the shock transmitted to the piston assemblage and any mechanism connected thereto caused by the sudden arrestment of motion of the piston assemblage.

Assuming now that fluid under pressure is supplied to chamber 12 via port 16 and chamber 18 is concurrently vented via port 23, the piston assemblage will be promptly shifted rightward to another limit position in which the outer face of piston 6 engages the stop 24; whereupon the pellets 26 in chamber 25 will continue to move to the right, by inertia, thereby doing work and dissipating energy for damping the tendency of the piston assemblage to rebound to the left, as will be understood from previous description.

It is to be noted that applicant's piston cushioning arrangement can be effectively used in conjunction with a fluid pressure motor device embodying a cushioning arrangement such as disclosed in U.S. Patent 2,719,510 granted October 4, 1955 to Elder, and wherein as the piston approaches the end of its stroke, the exhausting of air through a port is interrupted by a plug in the form of a piston boss entering a bore in the end wall of the casing and engaging a sealing ring encircling said bore, such that air is trapped between the piston and said end wall to thereby provided an air cushion. This sudden compression of the air causes the air to heat and expand and thereby cause the piston momentarily to rebound; and if the piston is operatively connected to such as a lever, the lever will, after having attained one position, temporarily move out of said one position. If, however, applicant's novel arrangement is associated with cushioning arrangements of the general type disclosed by Elder, such momentary rebound can be eliminated because applicant's aggregate 26 will be displaced by inertia and absorb the energy developed by the expansion of the entrapped air.

Having now described the invention, what I claim as new and desire to secure by Letters Patent, is:

1. A fluid pressure motor device comprising casing means, a double-acting hollow piston assemblage reciprocable in a bore in said casing means, and means in the form of loose particles of solid material disposed within said hollow piston assemblage and movable by inertia relative to said piston assemblage and to each other for dissipating energy when movement of said piston assemblage in one direction and the opposite direction, respectively, is suddenly arrested so as to thereby damp the tendency of said assemblage to rebound after such sudden arresting.

2. A fluid pressure motor device comprising casing means having a cylindrical bore, a hollow piston assemblage reciprocable within said bore, arresting means engageable by said piston assemblage for arresting movement thereof in one direction and the opposite direction, and a quantity of loose particles of solid material contained within said piston assemblage and movable in said one direction and opposite direction relative to said piston assemblage following the arrest of movement of the latter in said one direction and said opposite direction, respectively, such relative movement of said loose particles thereby dissipating energy so as to minimize the tendency of said piston assemblage to rebound after its movement is suddenly arrested by engagement with said arresting means.

3. A fluid pressure motor device comprising casing means having a central portion provided with a cylindrical bore and also having end portions enclosing the outer ends of said bore, each end portion being provided with a fluid pressure supply and release port, a hollow piston assemblage having a sealed chamber therein and being reciprocable within said bore between two limit positions and operable to one or the other of said limit positions by selective supply of fluid under pressure to one of said ports while the other is vented, stop means in each of said end portions engageable by said hollow piston assemblage for substantially defining said limit positions, and means in the form of loose particles of solid material contained within said sealed chamber and movable by inertia relative to said piston assemblage for dissipating energy after movement of said piston assemblage is suddenly arrested by its attainment of one or the other of said limit positions for thereby minimizing the tendency of said piston assemblage to rebound from its attained limit position.

4. A fluid pressure motor device comprising casing means, two spaced pistons reciprocable within a bore in said casing means, a cylindrical member interposed between said pistons for providing a chamber isolated from said bore, piston rod means controlled by reciprocable movement of said pistons, means operatively connecting said pistons and said cylindrical member to said piston rod means for providing a reciprocable assemblage, and a quantity of loose particles of solid material disposed in said chamber and movable relatively to said assemblage and to each other by inertia for dissipating energy when movement of the reciprocable assemblage in one direction or the opposite direction is suddenly arrested so as to thereby damp the tendency of said reciprocable assemblage to rebound.

5. A fluid pressure motor device comprising casing means having a central portion provided with a bore and also having end portions sealingly connected to said central portion at each end of said bore, a double-acting piston assemblage having two spaced pistons slidable in said bore, piston rod means controlled by reciprocable movement of said pistons, a cylindrical member interposed between said pistons for providing a chamber isolated from said bore, and means operatively connecting said pistons and said cylindrical member to said piston rod means, resilient stop means for each of said end portions and engageable by a corresponding one of said pistons for defining limits of fluid pressure induced reciprocable movement of said piston assemblage in one direction and in the opposite direction, respectively, and means in the form of loose particles of solid material disposed in and partially filling said chamber and movable relative to each other and to the piston assemblage by inertia for dissipating energy when movement of said piston assemblage in said one direction and opposite direction is suddenly arrested by engagement of the corresponding one of said pistons with its resilient stop means.

References Cited in the file of this patent

UNITED STATES PATENTS

| 101,217 | Blake | Mar. 29, 1870 |
| 1,995,620 | Monroe | Mar. 26, 1935 |
| 2,375,818 | Peters | May 15, 1945 |
| 2,719,510 | Elder | Oct. 4, 1955 |